United States Patent [19]

Iwasaki

[11] 4,312,005
[45] Jan. 19, 1982

[54] INK JET PRINTING APPARATUS

[75] Inventor: Kyuhachiro Iwasaki, Tokyo, Japan

[73] Assignee: Ricoh Company, Ltd., Tokyo, Japan

[21] Appl. No.: 130,915

[22] Filed: Mar. 17, 1980

[30] Foreign Application Priority Data

Mar. 19, 1979 [JP] Japan .................................. 54/31186

[51] Int. Cl.³ ........................................... G01D 15/18
[52] U.S. Cl. .................................. 346/75; 346/140 R
[58] Field of Search ............................. 346/75, 140 IJ

[56] References Cited

U.S. PATENT DOCUMENTS

| | | | |
|---|---|---|---|
| 3,604,846 | 9/1971 | Behane et al. ................. | 346/75 UX |
| 3,971,033 | 7/1976 | Fan ................................. | 346/75 X |
| 3,977,007 | 8/1976 | Berry et al. ...................... | 346/75 X |

*Primary Examiner*—George H. Miller, Jr.
*Attorney, Agent, or Firm*—David G. Alexander

[57] ABSTRACT

Minute ink particles are ejected from a nozzle (16) in the form of a stream and electrostatically charged. The widths of pulses fed to an electrode (21) which applies the charge are varied in accordance with a desired printing density. A voltage is applied to a first deflection electrode (23) when it is desired to print a dot to deflect ink particles onto a moving sheet (22). An alternating voltage is applied to a second deflection electrode (27) to deflect the ink particles perpendicular to the deflection direction of the first deflection electrode (23) so as to form a cluster of ink particles on the sheet (22) having a diameter equal to a desired dot size.

7 Claims, 7 Drawing Figures

INK JET PRINTING APPARATUS

BACKGROUND OF THE INVENTION

The present invention relates to an ink jet printing apparatus.

Ink jet printers are known in the art which print a dot on a sheet with a single drop of ink. However, these printers are only suitable for high contrast printing since there are no means for varying the printing density as is required for continuous tone printing in various shades of gray.

Improved ink jet printers have been developed comprising nozzles designed to eject a stream or jet of ink which breaks up into a stream of minute particles. The ink particles are electrostatically charged and deflected onto a sheet where it is desired to print a dot. In this manner, the dots are formed by a cluster or group of tiny ink particles. The widths of the charging pulses may be varied to thereby vary the relative number of ink particles in the clusters and the printing density of the dots. However, these printers have not been developed to a fully satisfactory state.

SUMMARY OF THE INVENTION

An ink jet printing apparatus embodying the present invention includes nozzle means for ejecting a stream of minute ink particles, charging means for selectively charging the ink particles and first deflection electrode means for selectively deflecting the ink particles along a first axis onto a surface for printing, and is characterized by comprising second deflection electrode means for deflecting the ink particles along a second axis which is perpendicular to the first axis so as to form a cluster of ink particles having a diameter equal to a desired dot size on the surface.

In accordance with the present invention, minute ink particles are ejected from a nozzle in the form of a stream and electrostatically charged. The widths of pulses fed to an electrode which applies the charge are varied in accordance with a desired printing density. A voltage is applied to a first deflection electrode where it is desired to print a dot to deflect ink particles onto a moving sheet. An alternating voltage is applied to a second deflection electrode to deflect the ink particles perpendicular to the deflection direction of the first deflection electrode so as to form a cluster of ink particles on the sheet having a diameter equal to a desired dot size.

It is an object of the present invention to provide an improved ink jet printing apparatus which is capable of producing faithful and high quality copies of original documents and the like.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
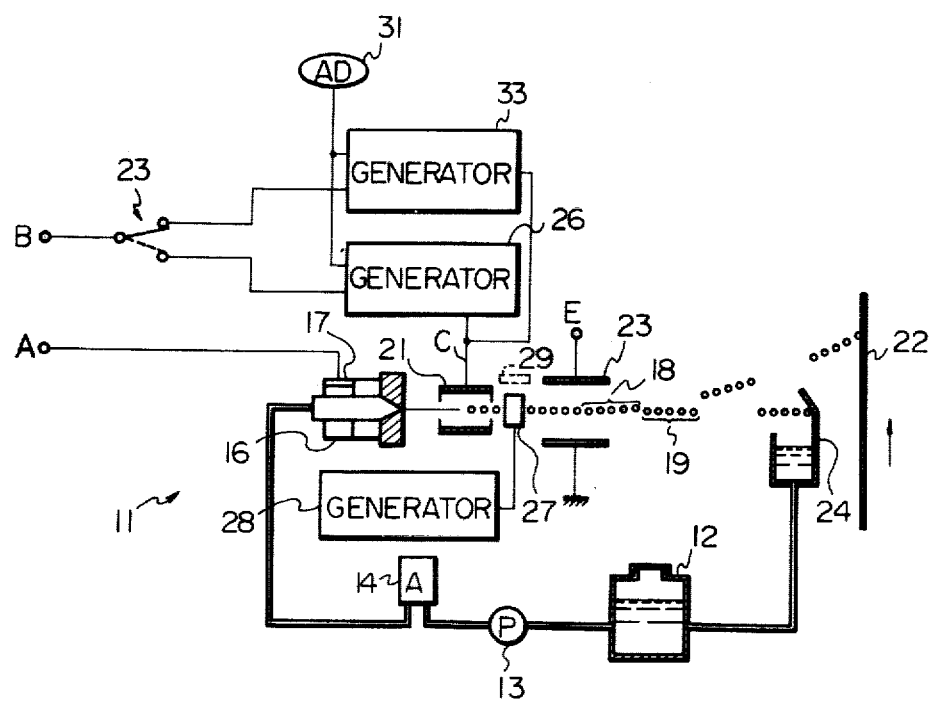
FIG. 1 is a block diagram of an ink jet printing apparatus embodying the present invention.
Figure 2:
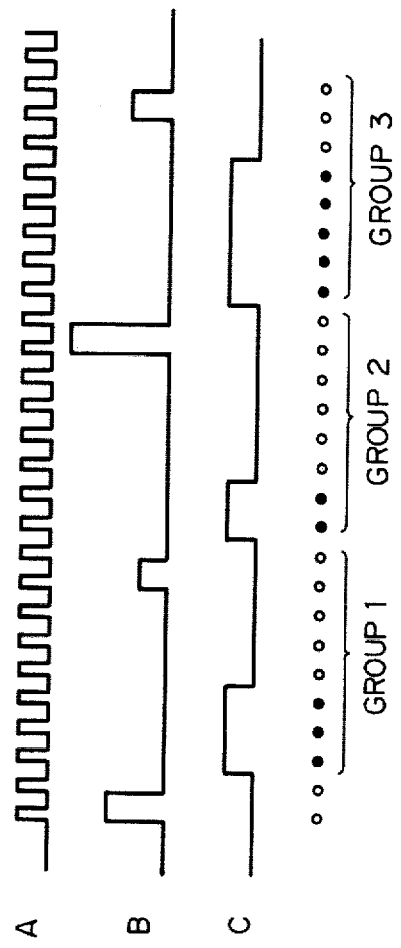
FIG. 2 is a diagram illustrating timing signals and corresponding ink particles.

Referring now to FIG. 1 of the drawing, an ink jet printing apparatus embodying the present invention is generally designated by the reference numeral 11 and comprises an ink reservoir or tank 12. Ink is continuously pumped from the tank 12 via an accumulator 14 to an ink ejection nozzle 16 by a pump 13. Drive signals B are applied to a piezoelectric oscillator 17 provided to the nozzle 16 as illustrated in FIG. 2. The signals B cause the ink to be ejected from the nozzle 16 in the form of a stream which separates into minute particles at a short distance from the nozzle 16. Some of the ink particles are electrostatically charged by a charging electrode 21 when charging pulses C are applied to the electrode 21. Where it is desired to print a dot on the surface of a moving sheet of paper 22, a signal E is applied to a deflecting electrode 23 which deflects the charged ink particles upwardly above a gutter 24 into the sheet 22 as indicated at 18. Uncharged particles in addition to charged particles passing the electrode 23 when the signal E is not applied are not deflected but hit the gutter 24 and are returned to the tank 12 as indicated at 19.

Pulse signals B having amplitudes corresponding to desired printing densities are applied to a signal generator 26 which produces the signals C in response thereto. The widths of the pulses C are proportional to the amplitudes of the signals B. The greater the width of the pulses C, the greater the proportion of ink particles which are charged as illustrated in FIG. 2. In this drawing, the lower line of circles correspond to ink particles, with charged particles being black and uncharged particles being white.

It will be understood that each dot printed on the sheet 22 consists of a cluster of minute ink particles, and that the number of particles in each cluster is proportional to the width of the corresponding pulse C.

The particles are formed in accordance with Rayleigh's theory of microscopic deformation. As the ink leaves the nozzle 16 it is in the form of a solid stream or jet. However, due to fluid instability, the solid stream separates into a stream of minute ink particles.

For a natural stream or jet of fluid, the particle frequency f, which is defined as the number of particles passing a given point per second, is given by the following equation, assuming that the point is chosen so that the particle formation is complete.

$$f = \frac{v}{2\sqrt{2}\,\pi a} \qquad (1)$$

where a is the diameter of the nozzle 6 and v is the velocity of ink ejection. The particle diameter D is given by the following equation.

$$D = \sqrt[3]{\frac{3\pi}{\sqrt{2}}} \cdot a \approx 1.88a \qquad (2)$$

It will thus be seen that the particle frequency f increases as the injection velocity v increases and decreases as the nozzle diameter a increases. It is also important to understand that the particle diameter D increases as the nozzle diameter a increases.

Figure 3A:
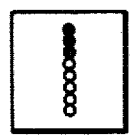
FIGS. 3a to 3d are diagrams illustrating printing patterns attained by the present apparatus.
Figure 3A:
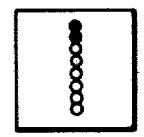
Figure 3A:
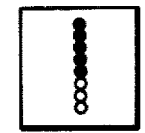

FIG. 3a illustrates the operation of the apparatus 11 comprising the components described thus far. In FIGS. 3a to 3d, black circles correspond to actual printed ink particles while white circles correspond to the positions of ink particles which would have hit the sheet 22 if they were charged. In response to the first pulse C illustrated in FIG. 2, out of eight consecutive ink particles three of the particles are charged in a first group. In second and third groups two and five ink particles respectively are charged. In this illustrative example, it will be assumed that a maximum of eight ink particles constitute a maximum density dot on the sheet 22.

The left, center and right blocks of FIG. 3a illustrate the printing pattern for the first to third groups of FIG. 2. It will be noticed that all of the ink particles form a vertical line on the sheet 22. This is undesirable since the cluster of ink particles should form a circular dot on the sheet 22.

This problem is overcome in accordance with the present invention by providing another deflection electrode 27 which deflects the ink particles in an axis perpendicular to the plane of the drawing. It will be understood that the electrode 23 deflects the ink particles along an axis which is vertical as viewed in FIG. 1.

Figure 3B:
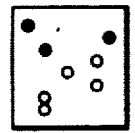
Figure 3B:
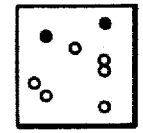
Figure 3B:
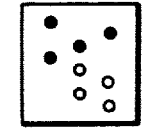

An alternating current signal is applied to the electrode 27 by a signal generator 28. The amplitude of the signal is rather low and is selected to be sufficient to deflect the ink particles into and out of the plane of the drawing to such an extent that when the ink particles hit the sheet 22 they will form a circular cluster having a diameter equal to a desired dot size. This is illustrated in FIG. 3b for the first to third groups of particles. In this manner, the present invention enables the formation of dots of desired shape (circular) and also accurate printing in black and white and various shades of gray. Preferably, the frequency of the alternating signal is varied in a random manner within a certain range to further spread out the ink particles.

Figure 3C:
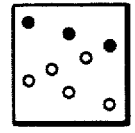
Figure 3C:
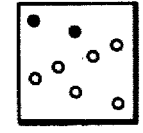
Figure 3C:
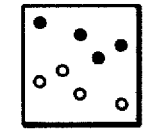
Figure 3D:
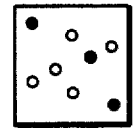
Figure 3D:
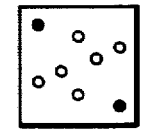
Figure 3D:
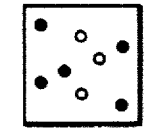

FIG. 3c illustrates a case in which the frequency of the alternating signal produced by the signal generator 28 is synchronized to the drive pulses A. The drive pulses A are selected to have a frequency equal to the natural frequency f given in equation (1) and produce more stable and regular formation of ink particles than would occur naturally.

It is also possible to provide another electrode which is illustrated in phantom line and designated as 29. The electrode 29 deflects the ink particles in the vertical direction. Application of signals from the generator 28 to both electrodes 27 and 29 produces the patterns shown in FIG. 3d.

Although the signal generator 26 is not illustrated in detail, it may be fabricated from standard electronic components with the main element being a voltage controlled monostable multivibrator connected so that the pulse width is varied in accordance with the amplitude of the pulses B.

The size of the printed dots tends to vary in accordance with various conditions such as the humidity, absorption rate, surface coating, size, etc. of the sheet 22. Excessive absorption will cause a blot and thereby a large dot whereas insufficient absorption will produce a run or dribble. It is therefore desirable to provide some sort of manual control of the printing density. Density control is also deisrable in ink ejection apparatus having multiple nozzles. The nozzle diameter a is very small, on the order of 20 to 30 microns, and is very difficult to machine with accuracy. In practical production, a tolerance range of up to 10% in the nozzle diameter a must be tolerated. However, this causes variation in the diameter of the ink particles as given in equation (2). Where the nozzles have different diameters, the diameters of the printed dots are also different, forming a distorted pattern. For this reason, a manual adjustment 31 is provided to vary the widths of the pulses C. Where the nozzle diameter a is relatively large and produces large ink particles, the widths of the pulses C are decreased to decrease the number of charged particles per printed dot and thereby the printing density, and vice-versa.

Typically, the adjustment 31 comprises a potentiometer or other component for producing a variable amplitude D.C. signal upon rotation of a knob or the like (not shown). This signal is algebraically combined with the pulses B in the signal generator 26 so that the widths of the pulse C are proportional to the signal generated by the adjustment 31. The density may be reduced to conserve ink where desired.

The apparatus described thus far functions to produce a faithful continuous tone reproduction of an original document or the like. However, it is sometimes desired to produce a pure black and white pattern on the sheet 22. Often, original documents which are copied consist only of printed characters, but if the quality of the original document is poor the density of the characters will vary in different areas of the document. In such a case, a reproduction which is superior to the original document may be obtained by printing with maximum contrast. Thus, all of the characters will have the same density and the background will be pure white.

Figure 4:
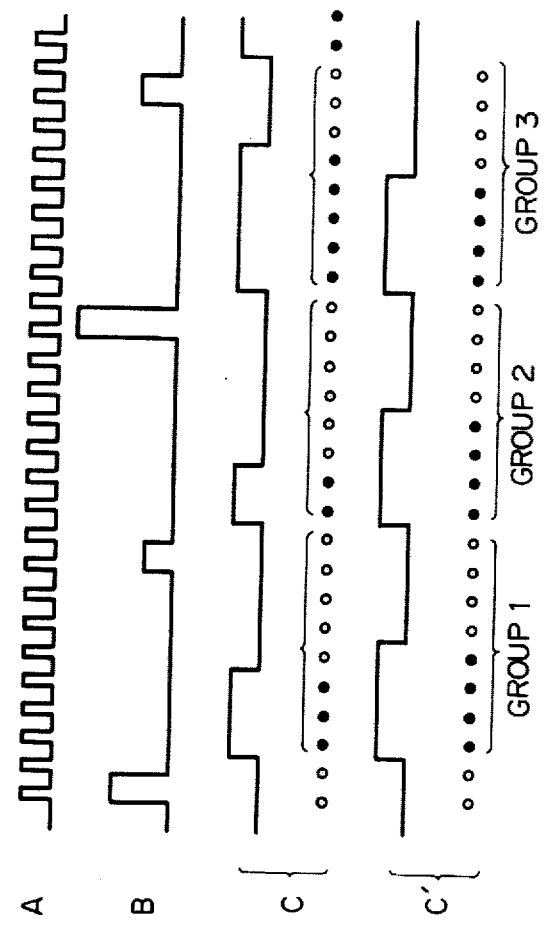
FIG. 4 is similar to FIG. 2 but illustrates operation of the present apparatus.

This is accomplished in accordance with the present invention by means of a selector switch 32 and another signal generator 33. The pulses B are selectively applied to the generators 26 and 33 by means of the switch 32 which is manually changed over by the operator. Whereas the generator 26 produces the signals C having pulse widths corresponding to the magnitudes of the pulses B, the signal generator 33 produces pulses C'all of which have the same width as illustrated in FIG. 4. Thus, all dots printed on the sheet 22 will have the same density which is manually selected by means of the adjustment 31.

In summary, it will be seen that the present invention provides an improved ink jet printing apparatus which produces excellent reproductions of any type of document or pattern. Various modifications will become possible for those skilled in the art after receiving the teachings of the present disclosure without departing from the scope thereof.

What is claimed is:

1. An ink jet printing apparatus including nozzle means for ejecting a stream of minute ink particles, charging means for selectively charging the ink particles and first deflection electrode means for selectively deflecting the ink particles along a first axis onto a surface for printing, characterized by comprising:

second deflection electrode means for deflecting the ink particles along a second axis which is perpendicular to the first axis so as to form a cluster of ink particles having a diameter equal to a desired dot size on the surface.

2. An apparatus as in claim 1, in which the second deflection electrode means comprises a deflection electrode and signal generator means for applying an alternating signal to the deflection electrode.

3. An apparatus as in claim 2, in which the alternating signal has a varying frequency.

4. An apparatus as in claim 1, in which the second deflection electrode means is further constructed to deflect the ink particles along the first axis.

5. An apparatus as in claim 1, in which the charging means comprises a charging electrode and signal generator means for applying variable width pulses having widths corresponding to desired printing densities to the charging electrode.

6. An apparatus as in claim 5, further comprising means for manually adjusting the widths of the pulses.

7. An apparatus as in claim 5, further comprising means for controlling the signal generator means to selectively apply fixed width pulses to the charging electrode.

* * * * *